(12) United States Patent
Ford et al.

(10) Patent No.: US 6,929,031 B2
(45) Date of Patent: Aug. 16, 2005

(54) ELECTRO-HYDRAULIC MANIFOLD ASSEMBLY WITH LEAD FRAME MOUNTED PRESSURE SENSORS

(75) Inventors: Greg E. Ford, Redford, MI (US); Timothy J. Green, Holly, MI (US); David E. Herbert, Rochester Hills, MI (US); Harold L. Bowman, Lapeer, MI (US); Peter M. Jacobsen, Oakland Township, MI (US)

(73) Assignee: Eaton Corporation, Cleveland, OH (US)

(*) Notice: Subject to any disclaimer, the term of this patent is extended or adjusted under 35 U.S.C. 154(b) by 187 days.

(21) Appl. No.: 10/401,408

(22) Filed: Mar. 28, 2003

(65) Prior Publication Data

US 2004/0187942 A1 Sep. 30, 2004

(51) Int. Cl.[7] ............................. F16K 11/10; G01L 7/00
(52) U.S. Cl. ......................................... 137/884; 73/756
(58) Field of Search ........................... 137/884; 73/756; 303/119.2, 119.3

(56) References Cited

U.S. PATENT DOCUMENTS

| | | | | |
|---|---|---|---|---|
| 6,220,101 B1 | * | 4/2001 | Schloss et al. ................ | 73/756 |
| 6,312,061 B1 | * | 11/2001 | Schliebe et al. ............... | 303/20 |
| 6,382,738 B1 | * | 5/2002 | Bayer et al. .............. | 303/119.2 |
| 6,530,856 B1 | * | 3/2003 | Kakiage ...................... | 475/123 |
| 6,662,825 B2 | * | 12/2003 | Frank et al. ................. | 137/557 |
| 6,805,146 B2 | * | 10/2004 | Albert et al. ............ | 137/15.18 |

* cited by examiner

*Primary Examiner*—John Fox
(74) *Attorney, Agent, or Firm*—Anna M. Shih; Roger P. Johnston

(57) ABSTRACT

An electro-hydraulic manifold assembly with a plurality of solenoid operated valves disposed on a manifold block and each operable to control pressure from the inlet to a separate outlet. Sensing ports are provided in each outlet with a pressure sensor sealed over the sensing port for providing a signal indicative of the sensed pressure. The pressure sensors are mounted on a lead frame and connected to conductive strips in the lead frame. The lead frame has slots therein which permit the frame to be simultaneously electrically connected by bayonet connection to the terminals on each solenoid valve as the transducers are sealed over the sensing ports and the lead frame attached to the manifold block.

11 Claims, 7 Drawing Sheets

ELECTRO-HYDRAULIC MANIFOLD ASSEMBLY WITH LEAD FRAME MOUNTED PRESSURE SENSORS

BACKGROUND OF THE INVENTION

The present invention relates to manifold assemblies of the type having an hydraulic fluid pressure inlet communicating with a plurality of valve chambers, each having an electrically operated valve ported therein for controlling, upon energization, fluid pressure selectively to individual outlets for the respective valving chambers. Manifolds of this type are employed for controlling pressure of hydraulic fluid in servo-actuators as, for example, clutch actuators in automatic speed-change power transmissions for motor vehicles where it is desired to control the speed change or shifting patterns of the transmission with an electronic controller. This arrangement has found widespread use in modern vehicle automatic transmissions because the electronic controller can receive in real time multiple inputs of vehicle operating parameters such as road speed, throttle position and engine RPM; and, the electronic controller can be programmed to provide optimum shifting patterns based upon known engine power available, vehicle mass and the operating parameter inputs.

However, in providing a shifting pattern for controlling hydraulic fluid pressure to each of the transmission speed change clutch actuators for effecting the desired shifting, it has been found that providing pressure sensors at the outlet of each of the electrically operated valves can provide a clutch actuator pressure signal in real time which is in actuality an analog of the force on the clutch which is in turn proportional to the torque transmitted by the clutch during engagement and disengagement. Such arrangement gives an electrical signal proportional to torque transmitted for a particular gear set and thus provides real time closed loop control of the transmission shifting. This arrangement has been found desirable as an alternative to predetermined shifting algorithms for open loop shift control by the electronic controller.

However, in providing the pressure sensors at each electric valve outlet for generating an electrical signal indicative of the shift clutch actuating pressure, it has been found disadvantageous from an assembly complexity, size and cost standpoint to provide individual electrical leads to the plurality of sensors and electrically operated valves on the manifold. Heretofore, individual wire leads with connector terminals have been connected to each pressure sensor and solenoid terminals on each valve and the leads bundled to form a wiring harness. This has been found to require a prohibitive large space for access to the terminals and the wiring harness within the transmission casing for the manifold assembly. Accordingly, it has been desired to find a way or means of electrically connecting to the plurality of pressure sensors and solenoid operated valves in a transmission shift control module or manifold assembly in a manner which is simple and easy to install in mass production and yet is sufficiently low in cost to render the technique desirable for competitive high volume light vehicle production.

BRIEF SUMMARY OF THE INVENTION

The present invention provides an electro-hydraulic manifold assembly with a plurality of solenoid operated valves for controlling pressure to individual or discrete pressure outlets in the manifold block and has a sensing port in each outlet. A plurality of pressure sensors are mounted on a lead frame with electrical leads attached to electrically conductive strips provided in the lead frame which make bayonet type connection with terminals on each valve upon attachment of the lead frame to the block. Upon attachment of the lead frame to the manifold block, the transducers each communicate respectively with one of the sensing ports. The lead frame has an electrical receptacle in one end thereof with terminal pins connected to each of the electrically conductive strip and adapted for connection to an electrical wiring harness connector.

The present invention thus permits individual connection of the electrical leads to the solenoid operated valves and installation of the pressure transducers in one operation when the lead frame is attached to the manifold block.

DETAILED DESCRIPTION OF THE INVENTION

Figure 1:
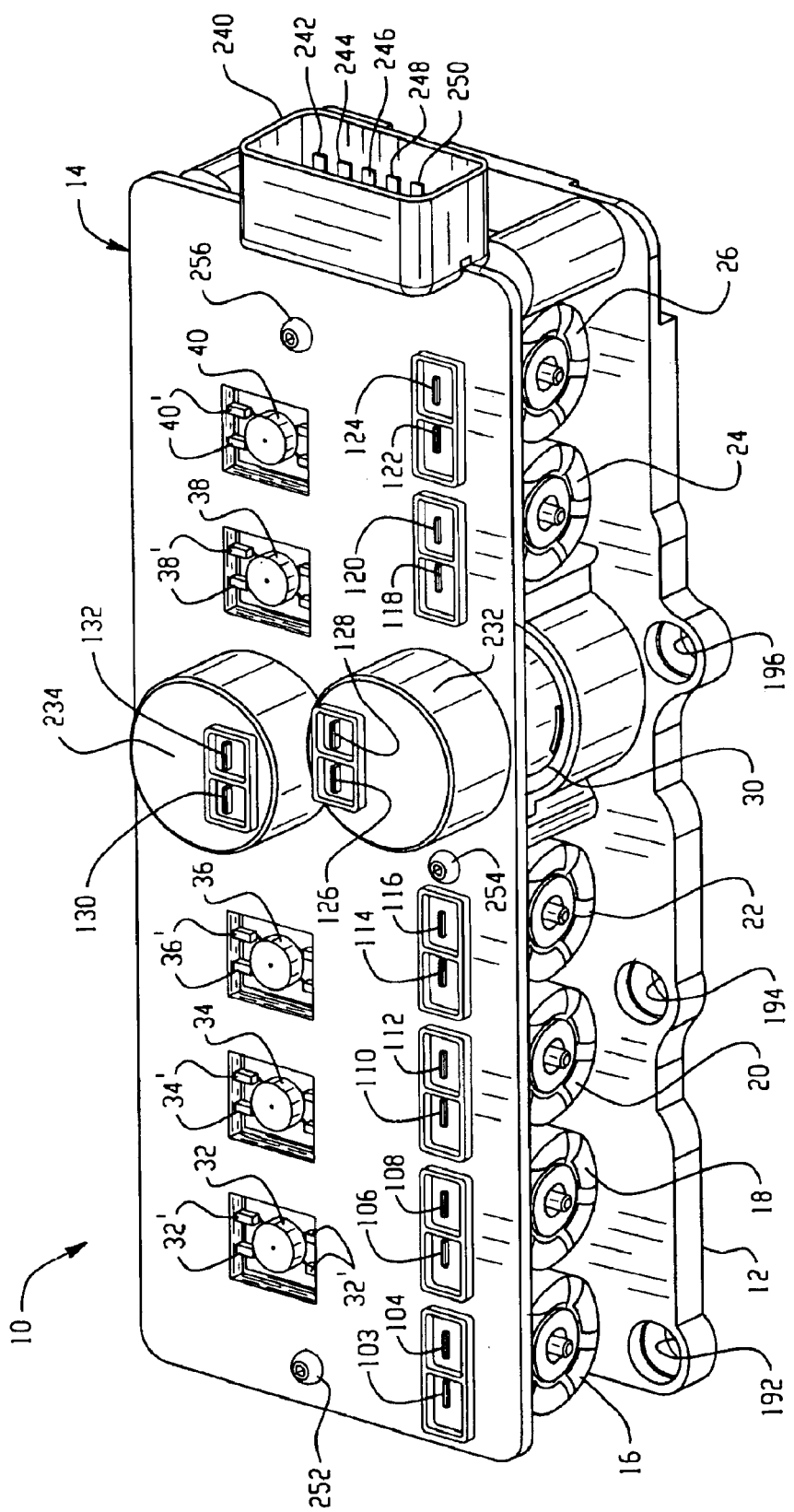
FIG. 1 is a perspective view of the assembled manifold block, valve, pressure sensors and lead frame.

Referring to FIGS. 1 through 5, an embodiment of the invention is indicated generally at 10 and includes a manifold block 12, an electrical lead frame assembly indicated generally at 14 and a plurality of solenoid operated valves 16,18, 20, 22, 24, 26, 28, 30.

The lead frame assembly 14 includes a plurality of pressure sensors or transducers 32, 34, 36, 38, 40, each having leads secured or attached to electrically conductive pads denoted respectively by the primed reference numeral for each of the transducers.

The manifold block 12 has a plurality of valving cavities 42, 44, 46, 48, 50, 52, formed horizontally in the vertically extending side 54 of the manifold block 12, with each of the valving cavities having an outlet passage denoted respectively 56, 58, 60, 62, 64, 66 which are connected (not shown) to the underside of the block and are adapted to connect with corresponding hydraulic passages in the device to be controlled such as the control pressure passages in an automatic transmission valve body for shifting clutch actuation.

Figure 2A:
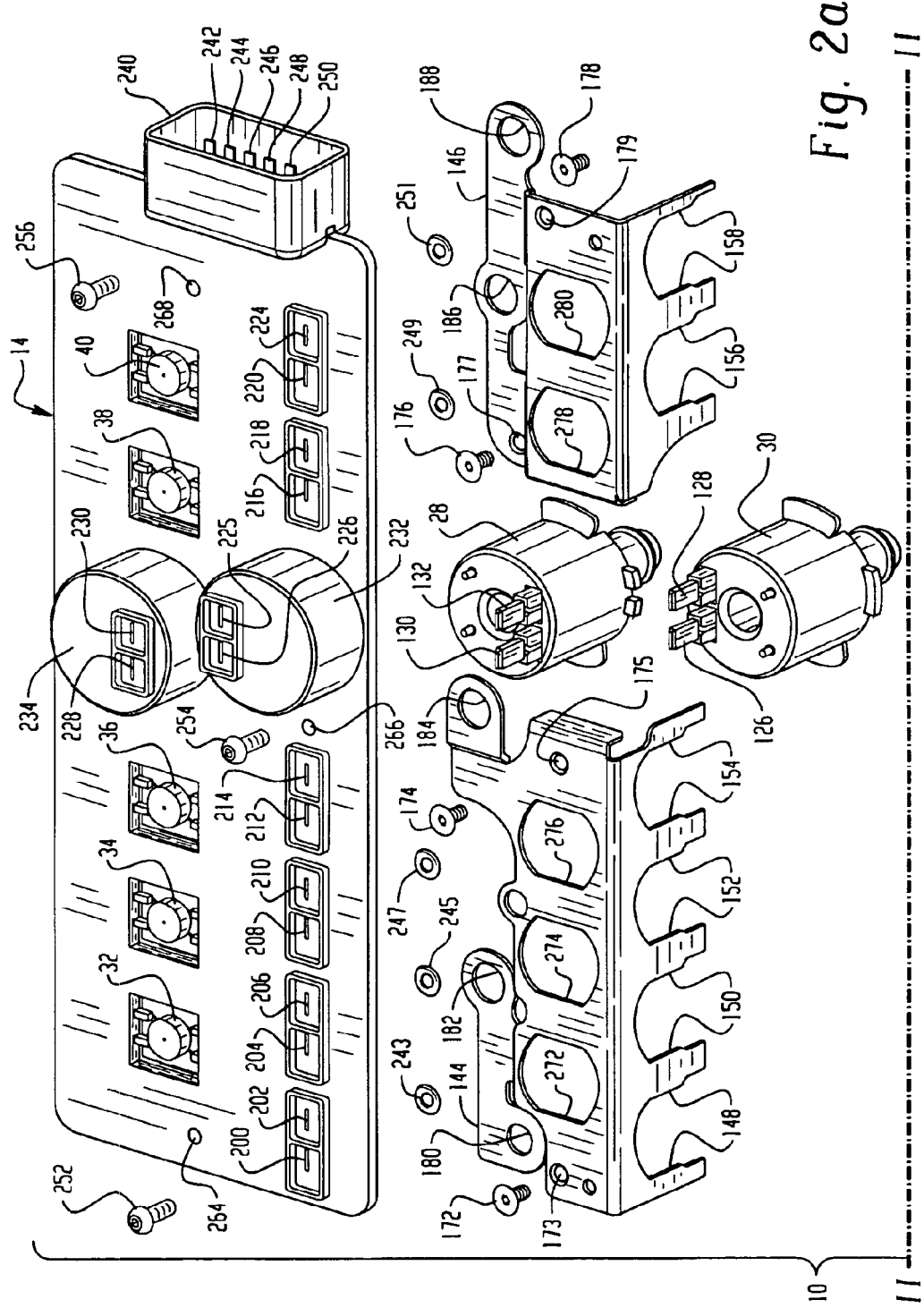
FIGS. 2a and 2b are a single exploded view of the assembly of FIG. 1 divided along separation line II—II.
Figure 2B:
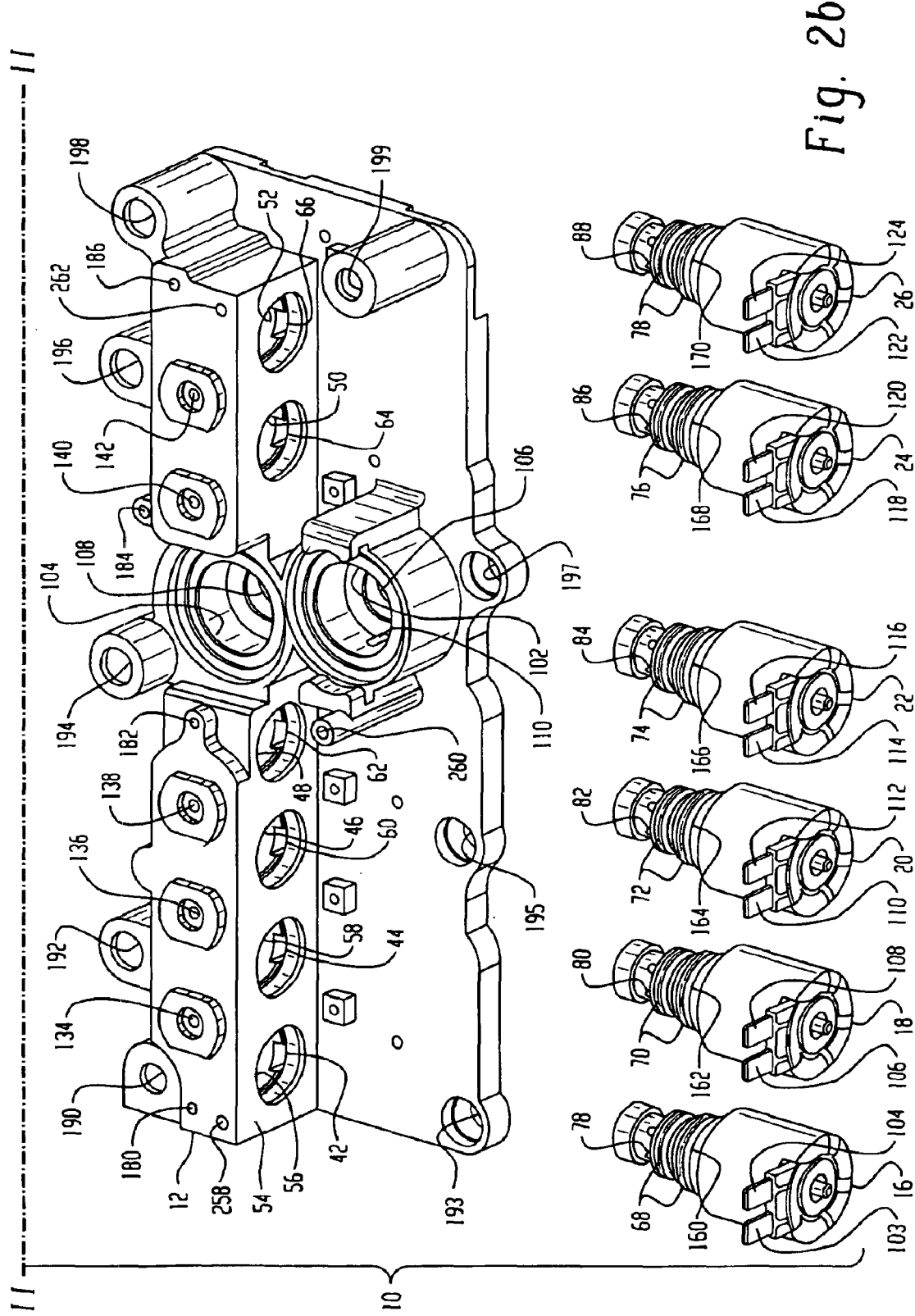
Figure 3:
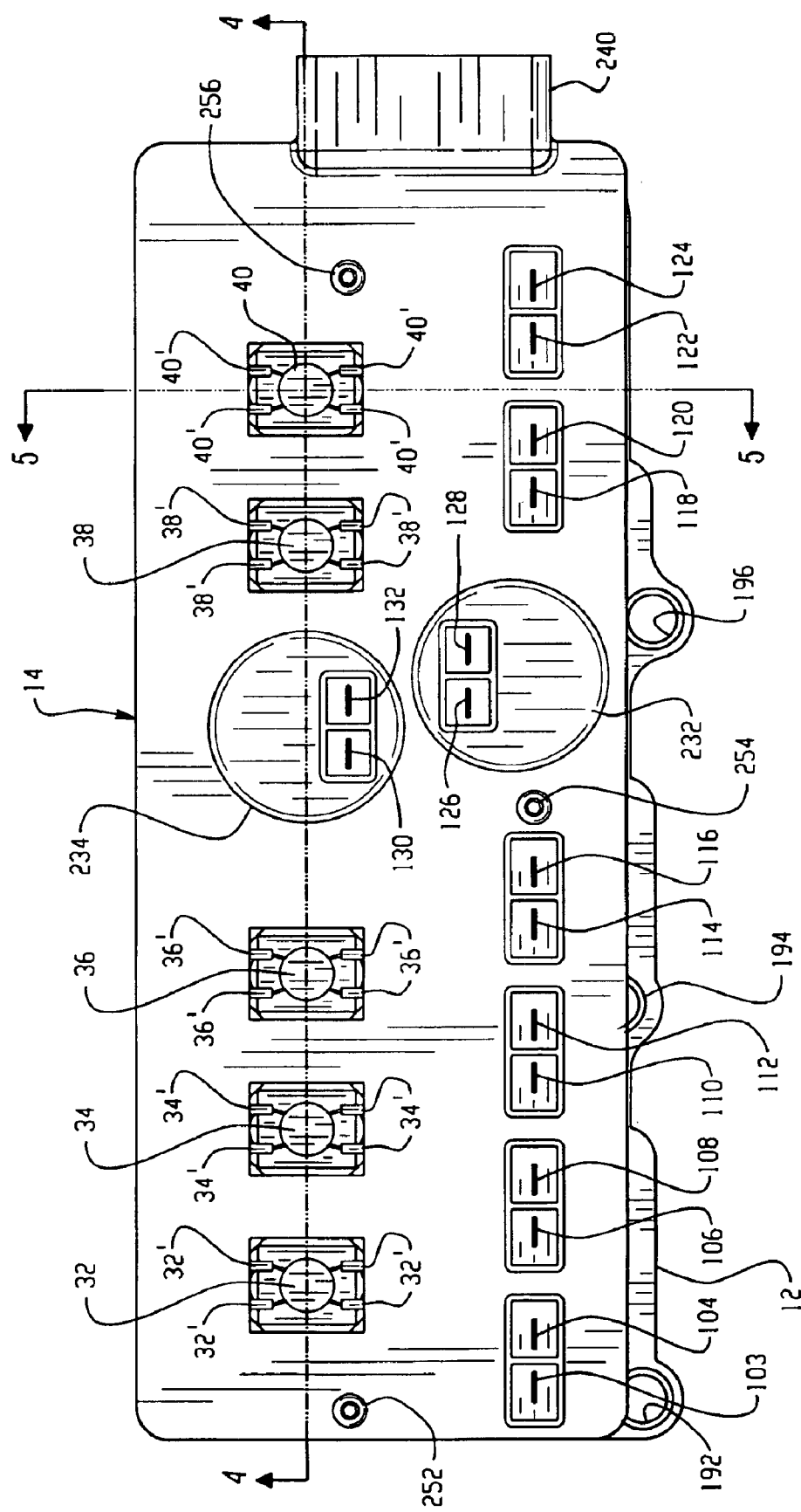
FIG. 3 is a plan view of the assembly of FIG. 1.

It will be understood that each of the valves 16 through 26 has an outlet passage (not shown) formed thereon between a pair of O-ring seals provided on the valve as denoted by reference numerals 68, 70, 72, 74, 76, 78 in FIG. 2b. It will be understood that an inlet passage (not shown) formed through the valve block communicates with an inlet 90, 92, 94, 96, 98, 100 respectively in the bottom of each of the valving chambers 42, 44, 46, 48, 50, 52 and provides pressurized fluid to the inlets at each of the solenoid valves denoted respectively 78, 80, 82, 84, 86, 88 in FIG. 2b.

Referring to FIGS. 2a and 2b, a pair of auxiliary valve chambers 102, 104 are formed in a horizontally extending upper face of the manifold 12; and, each has an inlet passage respectively 106, 108 formed in the bottom thereof. An outlet port is formed in the side of each of chamber 102, 104 thereof for providing flow to auxiliary functions in the transmission with one of the outlets visible in FIG. 2b and denoted by reference numeral 110. Solenoid operated valves 28, 30 are disposed in the chambers 102, 104 respectively.

Each of the valves 16 through 26 and 28, 30 has a pair of electrical connector terminals denoted respectively 103 through 132 extending in an upward direction therefrom for connection thereto as will hereinafter be described.

Block 12 has a plurality of spaced sensing ports provided on the upper surface thereof and denoted respectively by reference numerals 134, 136, 138, 140, 142; and, each of the ports 134 through 142 may be connected internally within the block to one of the outlet passages 56 through 66 respectively by intermediate passages (not shown) within the block. Alternatively, ports 134–142 may be connected to passages in the transmission valve body.

Figure 4:
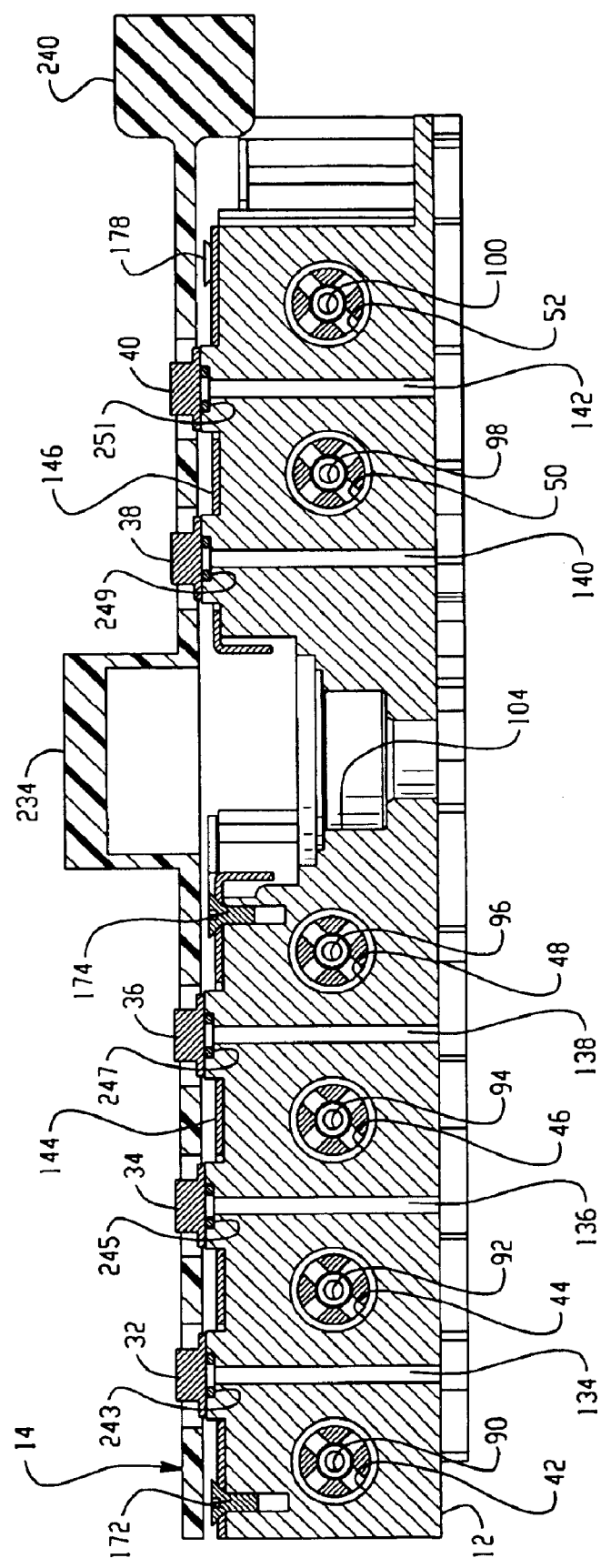
FIG. 4 is a section view taken along section indicating lines 4—4 of FIG. 3.

Referring to FIGS. 2a and 4, a pair of brackets having a generally right angle configuration denoted by reference numerals 144, 146 are provided with bifurcations or slots respectively 148 through 158 and are received over grooves denoted respectively 160 through 170 on the solenoid valves 16 through 26 respectively as shown in FIG. 2b for retaining the valves in their respective valving cavities. Brackets 144, 146 are retained on the manifold block 12 by screws 172, 174, 176, 178 through apertures 173, 175, 177, 179 in the brackets and which threadedly engage tapped holes 180, 182, 184, 186 provided in the upper surface of the block 12.

The brackets additionally have apertures 180, 182, 184, 186, 188 respectively formed therein which coincide with retaining fastener holes 190, 192, 194, 196, 198 provided in the manifold block for retaining bolts or screws (not shown) to pass therethrough for connection to a transmission housing. Similarly, manifold block has additional holes 193, 195, 197, 199 for receiving bolts or screws therethrough for attachment to a transmission deck.

Referring to FIGS. 1, 2a, 3, 4 and 5, the lead frame 14 has a plurality of slots 200 through 224 formed therein in pairs in spaced arrangements and located on the lead frame so as to be positioned for connection to electrical terminals 103 through 124 of valves 16 through 26 respectively. A second set of slots 225 through 230 is provided on the top of raised portions 232, 234 formed in the lead frame to accommodate the vertically extending valves 28, 30, and, slots 225 through 230 are positioned so as to each be located directly above one of the electrical terminals 126 through 132 respectively.

The lead frame 14 has an electrical receptacle portion 240 formed on one end thereof which has a plurality of electrical connector pins provided therein, five of which are shown and denoted by reference numerals 242 through 250 in the drawings. It will be understood that the electrical terminals such as terminals 242 through 250 are respectively connected to conductive strips (not shown) extending within the frame 14 and which are each connected respectively to one of the pads such as 32', 34', 36', 38', 40' and also to unshown strips which have portions thereof exposed in the slots 200 through 224 and slots 226 through 230. Thus, the entire lead frame assembly 14 is received over the manifold block 12 and simultaneous electrical connection is made with the terminals 103 through 132. The lead frame is then secured to the block 12 by screws 252, 254, 256.

Figure 5:
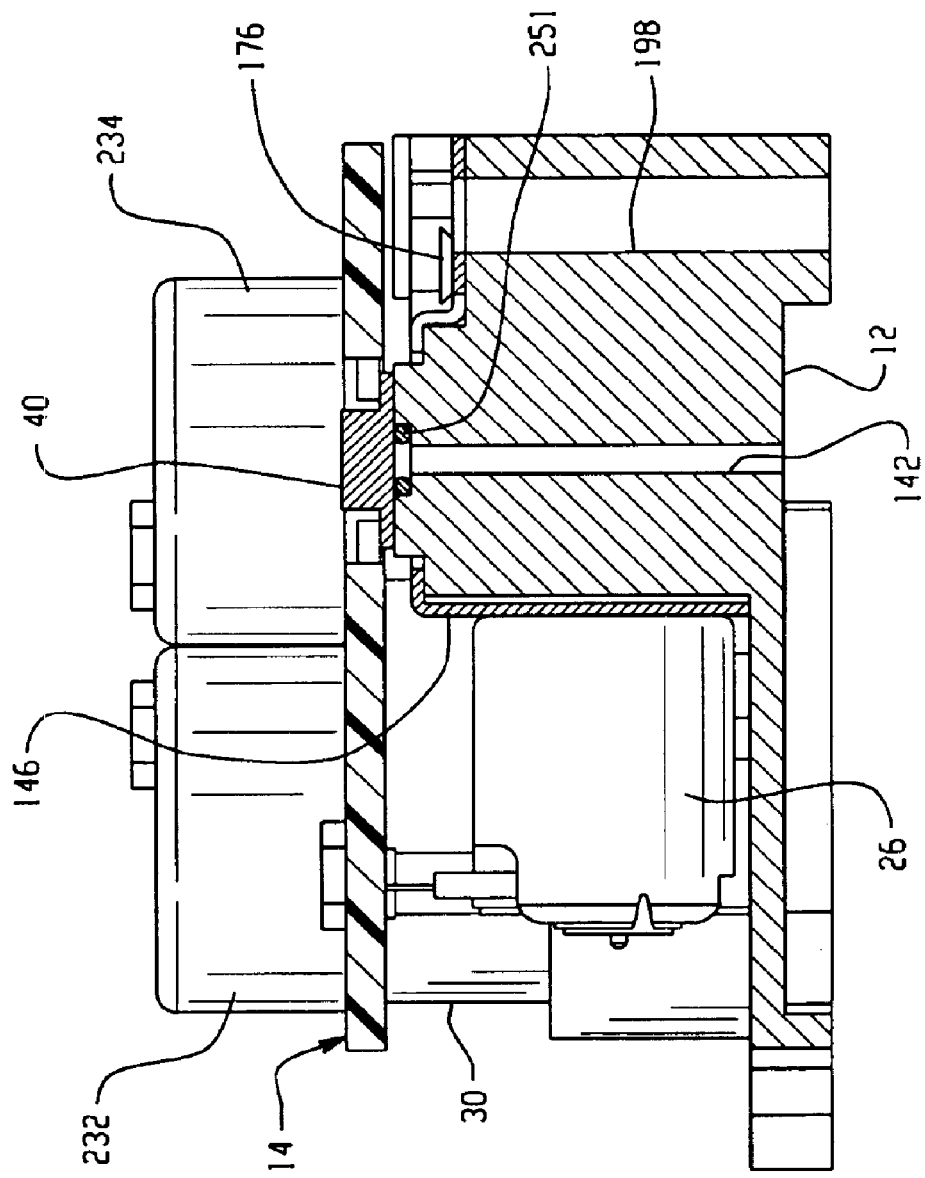
FIG. 5 is a section view taken along section indicating lines 5—5 of FIG. 3.

Referring to FIGS. 2a, 4 and 5, a plurality of O-rings denoted respectively 243, 245, 247, 249, 251 are disposed respectively each in a counter bore or annular groove formed at the top of each of the sensing ports 134 through 142 and provide for sealing about the upper end of the port with the undersurface of the respective pressure transducer 32 through 40 associated therewith. The O-rings are pre-placed in the counter bores and are each sealed respectively against the undersurface of one of the sensors 32 through 40 upon installation and attachment of the lead frame to the manifold block by fasteners such as screws 252, 254, 256 which threadedly engage tapped holes 258, 260, 262 in the top of the block 12 and are received through correspondingly located apertures 264, 266, 268 respectively formed through the lead frame.

Referring to FIG. 2a, it will be apparent that brackets 144 and 146 have clearance apertures denoted respectively 272, 274, 276 and 278, 280 formed therein to provide clearance about the sensing ports 134 through 142 for the pressure sensors 32 through 40 to extend upwardly through the brackets.

Figure 7:
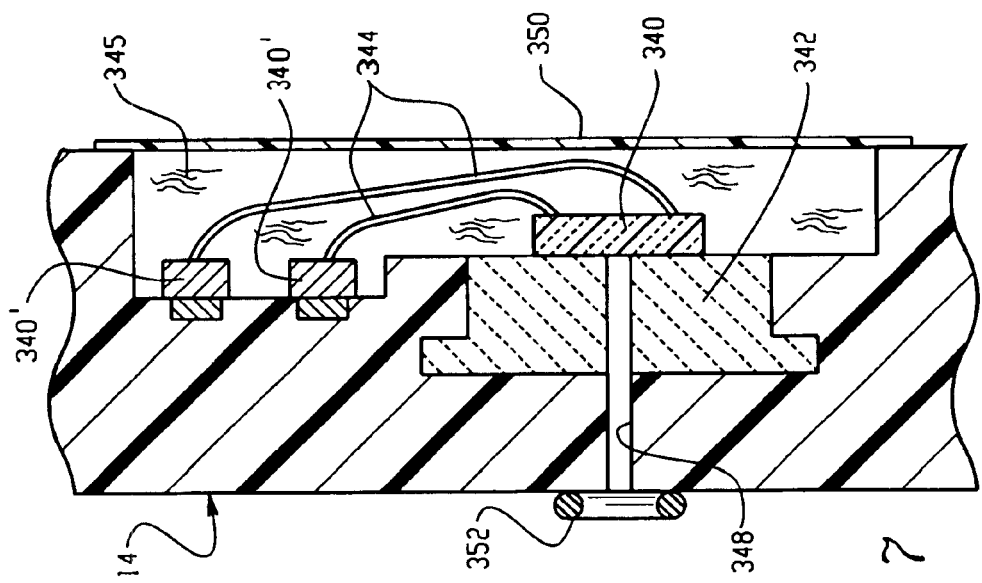
Figure 6:
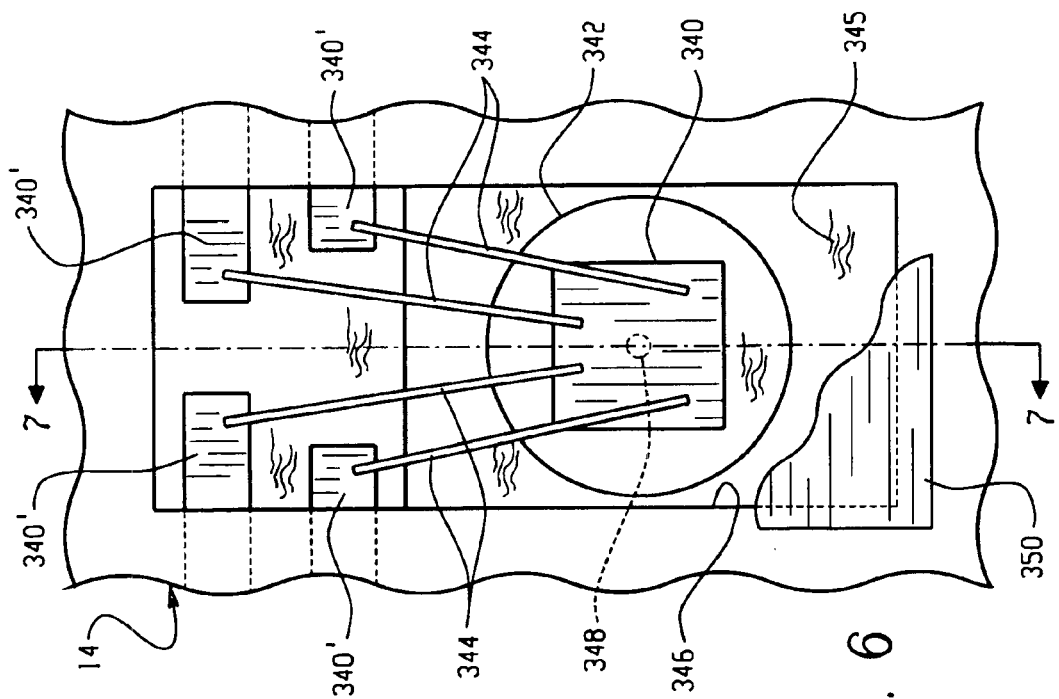
FIG. 6 is an enlarged view of a portion of FIG. 3 showing an alternate embodiment of the pressure sensor arrangement; and, FIG. 7 is a section view taken along section-indicating lines 7—7 of FIG. 6.

Referring to FIGS. 6 and 7, a preferred arrangement or embodiment for mounting of a typical solid state pressure sensor die 340 is illustrated wherein the die is mounted on a ceramic disk 342 with leads 344 extending from the die for attachment to exposed pads 340' provided at the ends of the conductors, shown in dashed outline in FIG. 6, which are embedded in the lead frame. Die 340 is bonded such as by the use of epoxy resin or other suitable adherent to the ceramic disk. The lead wires 344 from the die are then attached one each to the pads 340' respectively by any suitable expedient such as weldment. A recessed cavity 346 provided in the lead frame 14 surrounding the die 340 is then filled with a suitable potting agent 345 as, for example, silicone gel, to protect the electrical connections. The recessed cavity as filled with the silicone gel may then be sealed with a suitable plastic cover 350 for further protection. It will be understood that the pressure signal enters through a suitable aperture or sensing hole 348 to apply the sensed pressure to the undersurface of the die 340. The disk 342 is sealed over the manifold sensing port by a suitable resilient seal ring 352. It will be understood that the sealing for the pressure sensor and the sensing port of the manifold for the embodiment of FIGS. 6 and 7 is accomplished in the same manner as that for the embodiment 10 of FIGS. 1 through 5.

The present invention thus provides a unique and novel construction of a lead frame with solid state pressure transducers electrically connected thereto such that the lead frame may be installed upon an electro-hydraulic manifold block and simultaneously electrically connected to electric terminals for the valve solenoid operators thereon and to also simultaneously make a pressure sealed connection with sensing ports provided in the manifold block. The present invention provides a simple and easy to assemble construction for an electro-hydraulic manifold assembly and eliminates the need for wiring harnesses, thereby providing a cost effective construction for high volume production of such a manifold.

Although the invention has hereinabove been described with respect to the illustrated embodiments, it will be understood that the invention is capable of modification and variation and is limited only by the following claims.

What is claimed is:

1. An electro-hydraulic manifold assembly comprising:
 (a) a manifold block having an inlet port communicating with a plurality of valving chambers, with each chamber having a discrete outlet port and a pressure sensing port communicating with each outlet port;

(b) an electrically operated valve disposed to control pressure in each of said chambers between said inlet port and the respective discrete outlet port;

(c) a lead frame disposed on said block having a plurality of sets of electrical terminals, with each set making electrical connection with one of said valves;

(d) the lead frame including a plurality of inserts therein each having a passage therethrough with each passage located thereon so as to be positioned for communicating respectively with one of said pressure sensing ports, with each insert having a pressure transducer thereon communicating with said passage; and, (e) means operative for securing said lead frame to said block.

2. The assembly defined in claim 1, wherein said inserts are formed of ceramic material.

3. The manifold assembly defined in claim 1, wherein each of said pressure transducers comprises a die electrically connected to conductors on said lead frame.

4. The manifold assembly defined in claim 1, wherein said lead frame has the said sets of electrical terminals arranged for bayonet type connection with said valves.

5. The manifold assembly defined in claim 1, wherein said sets of electrical terminals and said pressure transducers are connected to a common receptacle on said lead frame for external electrical connection thereto.

6. The manifold assembly defined in claim 1, wherein said pressure transducers have leads attached to pads formed on electrical conductors on said lead frame.

7. A method of making an electro-hydraulic manifold assembly comprising:

(a) providing a block and forming an inlet passage and a plurality of spaced valving chambers each having a discrete outlet passage in the block communicating therewith with a sensing port formed in each outlet passage;

(b) forming an electrical lead frame with a plurality of sensing orifices thereon and locating each of aforesaid orifices to align with one of the sensing ports and disposing a plurality of inserts therein each having a passage communicating with one of said sensing orifices;

(c) mounting an electrically operated valve in each valving chamber and porting the valve for controlling pressure from the inlet passage to the respective discrete outlet;

(d) mounting a pressure transducer over each of said insert passages and electrically connecting the transducer to the lead frame; and, (e) attaching said lead frame to the block and aligning each of said sensing orifices with one of said sensing ports and electrically connecting said lead frame to each of said valves.

8. The method defined in claim 7, wherein the step of electrically connecting to said valves includes forming slots in said lead frame and inserting electrical terminals on said valves in said slots and making contact with conductive strips in said lead frame.

9. The method defined in claim 7, wherein the step of disposing a plurality of inserts includes disposing ceramic inserts.

10. The method defined in claim 7, wherein the step of disposing a plurality of inserts includes embedding and exposing a surface thereof.

11. The assembly defined in claim 1, wherein said inserts are embedded with a surface thereof exposed.

\* \* \* \* \*